F. B. CHARROIN.
TANK VALVE.
APPLICATION FILED FEB. 24, 1910.
990,337.
Patented Apr. 25, 1911.
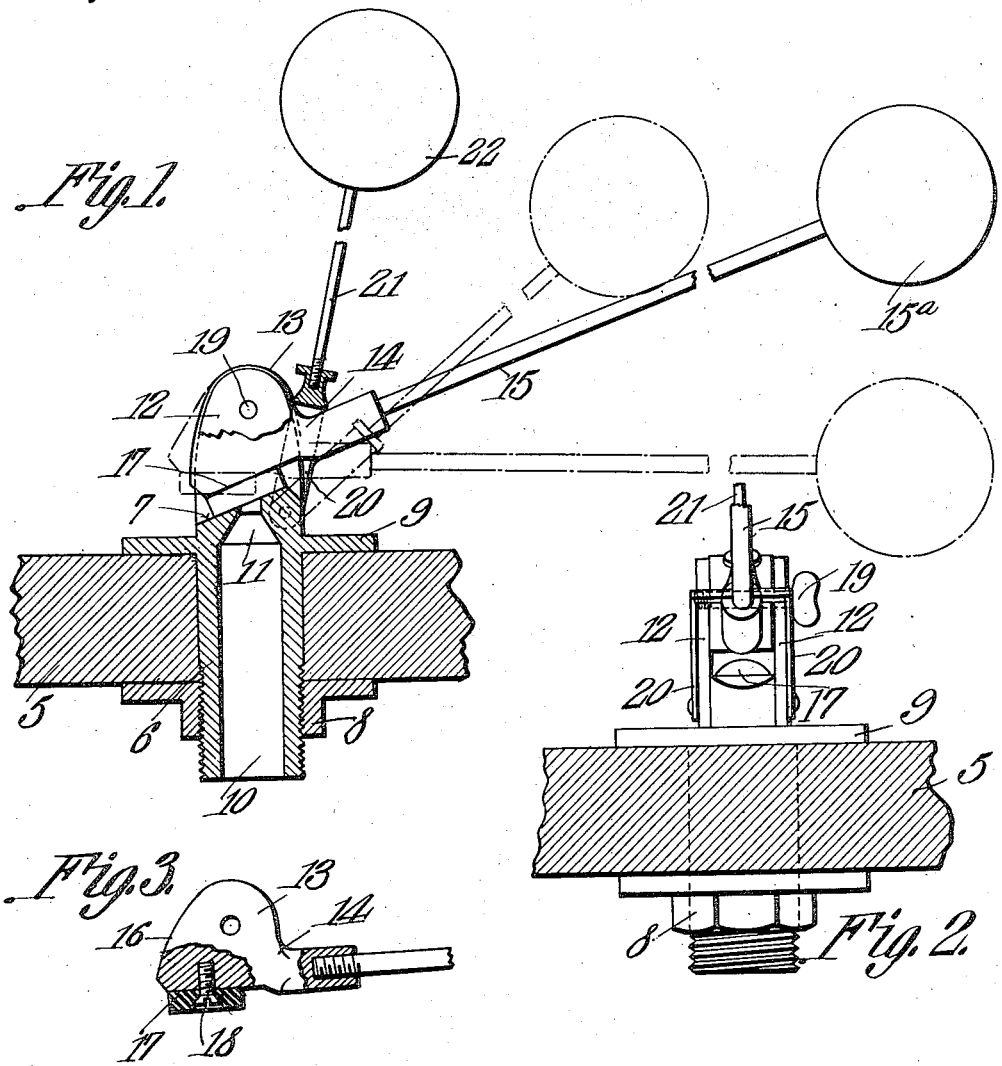
F. B. Charroin,
Inventor

UNITED STATES PATENT OFFICE.

FRANK B. CHARROIN, OF SOUTH BELLINGHAM, WASHINGTON, ASSIGNOR OF TWO-TENTHS TO OLIVE E. CHARROIN AND ONE-TENTH TO IDA A. CHARROIN, OF SOUTH BELLINGHAM, WASHINGTON.

TANK-VALVE.

990,337.     Specification of Letters Patent.      Patented Apr. 25, 1911.

Application filed February 24, 1910. Serial No. 545,634.

*To all whom it may concern:*

Be it known that I, FRANK B. CHARROIN, a citizen of the United States, residing at South Bellingham, in the county of Bellingham and State of Washington, have invented a new and useful Tank-Valve, of which the following is a specification.

This invention relates to valves employed for controlling the flow into tanks, and more particularly one which is operated by a float.

It is the object of the invention to provide a valve of the kind stated which is simple in construction, and noiseless in operation, and also one which opens and closes quickly.

Another object of the invention is to provide a valve structure which enables the valve to be easily repaired, the parts being readily separated, or taken apart for this purpose.

The invention also has for its object to provide a novel arrangement of valve operating means, whereby such an increase of leverage is obtained, that the valve may be employed where there is a high pressure in the water main.

Other objects and advantages of the invention will be made manifest from the description appearing hereinafter, reference being had to the accompanying drawings, in which, Figure 1 is a vertical section of the valve. Fig. 2 is an end view. Fig. 3 is a side elevation, partly broken away, of the valve proper.

In the drawing, 5 denotes a fragment of the wall of the tank to which the valve shown in Figs. 1 to 3 is applied. Mounted in an opening made in the wall 5 is a nipple 6 which extends for a short distance into the tank, and has its end thus extending into the tank made slanting or beveled as indicated at 7, said slanting or beveled end forming a seat for the valve proper to be presently described. The nipple also extends for a short distance to the outside of the wall 5, this portion of the nipple being screw threaded to receive a coupling nut 8 which screws against the outside of the wall. On the inside of the tank wall, the nipple is formed with a flange 9 which engages the inner surface of said tank wall. Upon screwing the nut 8 against the outer surface of the tank wall, the nipple will be securely held in place, and if desired suitable gaskets may be interposed between the tank wall, and the shoulder 9 and nut 8.

The bore 10 of the nipple terminates in a reduced portion 11 opening through the beveled end 7. The service pipe is connected to the nipple in any suitable manner, the flow being into the bore of the nipple, and out of the same through the reduced portion 11 when the latter is uncovered by the valve.

From the flange 9 rise upstanding ears 12 between which is pivoted the valve proper, the same comprising an angular body 13 having connected to one of its branches 14 a rod 15 which carries a float 15$^a$. The other branch of the body 13 is faced at its outer end with a disk 17 of rubber or other suitable packing material, the same being secured by a screw 18.

The pivot of the valve body 13 is a pin 19 passing through the ears 12 and through the valve body therebetween, said pin being screwed into one of the ears, so that it may be readily removed to release the valve body, and enable the same to be taken off to facilitate the renewal of the disk 17 when the same becomes worn. The valve body 13 fits snugly between the ears, and is thus held against lateral movement.

The face of the disk 17 is perfectly flat and seats squarely on the beveled portion 7 of the nipple end, over the outlet 11. The valve swings to open and closed position in the arc of a circle having for its center the pivot 19, by reason of which it will be evident that it does not move to closed or open position in the line of the pressure, but in a curve across the same. This makes a quick and noiseless shut off, and the valve, when opening, comes at once to wide open position.

It will be noted in Fig. 1 that the pivot 19 is in perpendicular alinement with the center of the outlet 11, and also located a short distance to one side of a line drawn from this point perpendicular to the beveled surface 7. By this arrangement an increased leverage is obtained, and the valve is enabled to shut tightly against a high pressure.

Means are also provided for preventing gradual closing of the valve as the water level rises in the tank, the object being to hold the valve wide open until the desired water level is attained in the tank, and then to suddenly close the valve. This action is effected by the following means: To the ears 12, below the pivot 19, are pivoted the branches 20 of a fork, the fork straddling the branch 14 of the valve body 13, and carrying a stem 21 to the outer end of which is fitted a float 22. As already stated, the fork straddles the branch 14, and when the valve is in open position the head of the fork comes into position behind the outer end of the branch 14 as shown by dotted lines in Fig. 1. With the parts in this position, the valve will be securely locked in open position. It will be noted that the float 22 is located above the float $15^a$ by reason of which the fork will remain stationary in locking position until the water level reaches the float 22, whereupon the fork swings in a position to release the valve, and the same closes. When the valve is locked in open position as stated, and the water level in the tank commences to rise, the float $15^a$ will be immersed in the water, and its buoyancy will cause it to rise suddenly in the water when the valve is released, and the latter is thus moved quickly to closed position by the rising of the float $15^a$ in the water.

What is claimed is:—

A valve comprising a nipple having a seat, a valve proper pivoted to the nipple and adapted to close against the seat thereof, said valve proper having a branch forming a shoulder, a float attached to the valve, a fork pivoted to the nipple and adapted to engage at its intermediate portion the shoulder of the valve branch and lock the valve proper in open position, and a float attached to said fork.

In testimony that I claim the foregoing as my own, I have hereto affixed my signature in the presence of two witnesses.

FRANK B. CHARROIN.

Witnesses:
C. E. PREINKERT,
GEO. B. PITTS.